P. C. MERKER.
STAY CHAIN ATTACHING DEVICE FOR CAR DOORS, &c.
APPLICATION FILED AUG. 18, 1913.

1,086,605. Patented Feb. 10, 1914.

WITNESSES
Jas. F. McCathran
H. F. Riley

Philip C. Merker, INVENTOR
BY
C. G. Siggers
ATTORNEY

UNITED STATES PATENT OFFICE.

PHILIP C. MERKER, OF CEDAR RAPIDS, IOWA.

STAY-CHAIN-ATTACHING DEVICE FOR CAR-DOORS, &c.

1,086,605.  Specification of Letters Patent.  Patented Feb. 10, 1914.

Original application filed January 13, 1913, Serial No. 741,865. Divided and this application filed August 18, 1913. Serial No. 785,449.

*To all whom it may concern:*

Be it known that I, PHILIP C. MERKER, a citizen of the United States, residing at Cedar Rapids, in the county of Linn and State of Iowa, have invented a new and useful Stay-Chain-Attaching Device for Car-Doors, &c., of which the following is a specification.

The invention relates to a stay chain attaching device for car doors, etc., and is a division of an application, filed by me on or about the 13th day of January, 1913, Serial No. 741,865.

The object of the present invention is to provide a simple, inexpensive and efficient chain attaching device of strong and durable construction, designed for enabling a stay chain for holding a car door or other part to be securely anchored to the floor, and capable of permitting the stay chain to be readily detached, and adapted to present a smooth upper surface in flush relation with the floor of the car when the chain is engaged with it and also when removed from it.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

Figure 1:
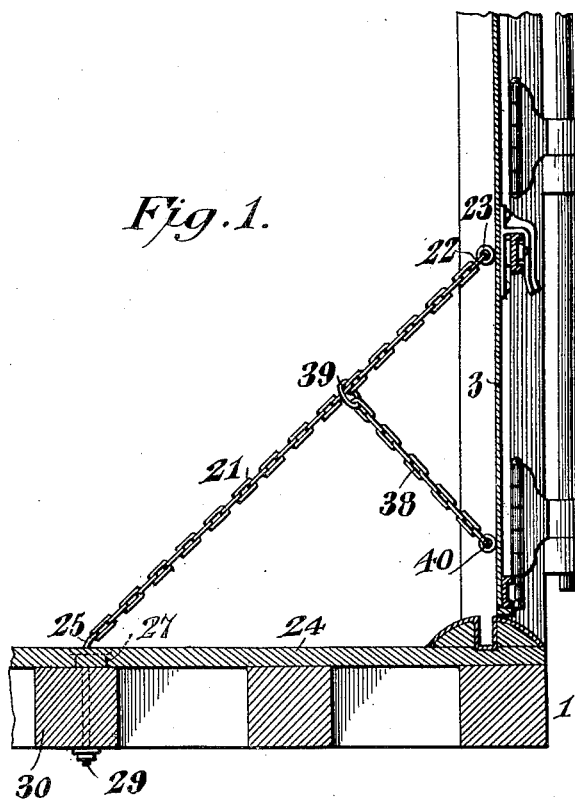
Figure 2:
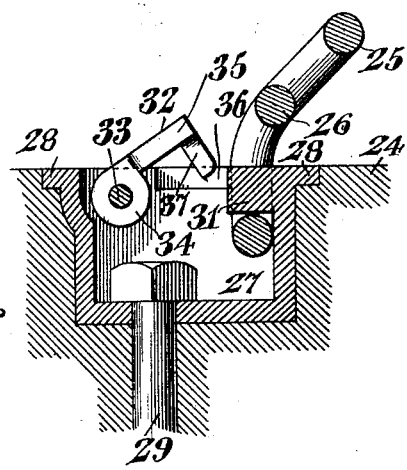
Figure 3:
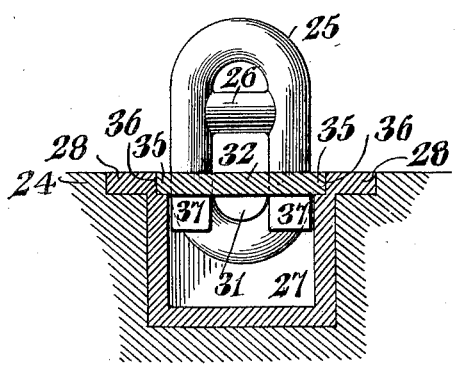
Figure 4:
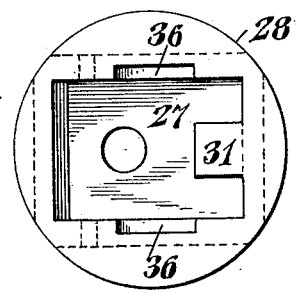
Figure 5:
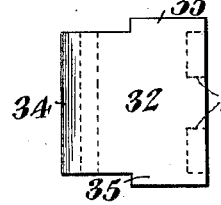
Figure 6:
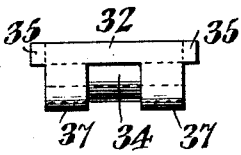

In the drawing:—Figure 1 is a vertical sectional view of a portion of a car and a grain door provided with chain attaching means, constructed in accordance with this invention. Fig. 2 is an enlarged vertical sectional view of the chain attaching device, the locking plate being raised. Fig. 3 is a similar view taken at right angles to Fig. 2, the locking plate being arranged in its closed or locking position. Fig. 4 is a plan view of the socket piece. Figs. 5 and 6 are detail views of the hinged locking plate.

Like numerals of reference designate corresponding parts in all the figures of the drawing.

In the accompanying drawing in which is illustrated the preferred embodiment of the invention, the chain attaching device is shown applied to a car 1 for enabling the lower end of an inclined bracing or stay chain 21 to be detachably secured at its lower end to the floor 24 of the car 1, but the device is applicable to various stay chains and may be used in any analogous position where it is desired to detachably connect a bracing or stay chain with a relatively fixed part. The stay chain 21 is provided at its upper end with a ring 22, which is linked into an eye bolt 23, mounted on a car door 3 and preferably constituting the pivot of a door engaging bar and constructed as shown and described in an application, filed by me on or about Oct. 19, 1912, Serial No. 726,753. The chain 21 extends downwardly and inwardly from the door 3 to the bottom or floor 24 of the car, and it is equipped at its lower end with an angular link 25, preferably connected intermediate of its ends by a transverse brace 26 and having its lower portion disposed in a substantially vertical position when in engagement with the chain attaching device.

The chain attaching device comprises in its construction a socket piece 27 let into the bottom or floor 24 of the car and open at the top and provided thereat with an outwardly extending flange 28, which is arranged in flush relation with the upper face of the floor or bottom of the car. The socket piece is composed of a horizontal bottom and vertical side walls and end walls, and it is secured to the car by a vertical bolt 29, which pierces the bottom of the socket piece and preferably extends through one of the timbers 30 of the frame of the car. The socket piece is provided at its outer end wall with a horizontal lug 31, projecting inwardly at the upper portion of the socket piece and having its upper face arranged in flush relation with the upper face of the flange 28. The lug 31 is adapted to extend through the lower portion of the link 25, which is maintained in engagement with the lug 31 by a hinged locking plate mounted on a horizontal pivot or pintle 33, which passes through an eye 34 of the locking plate 32. The locking plate 32, which forms a hinged cover or closure for the socket piece, is recessed at its inner or rear portion at the ends of the eye, and the ends 35 of the front portion project beyond the eye and are adapted to extend into recesses 36 in the side walls of the socket piece, whereby the locking plate is supported in its horizontal engaging position. The locking plate is provided at the front with depending flanges 37, located at opposite sides of the lug 31 when the locking plate 32 is in its horizontal engaging position. The lug 31 is spaced from the side walls of the socket piece to receive the links 25, and the flanges 37, which depend from the locking plate 32, are located opposite the link receiving spaces and are adapted to confine the sides of the link in the same to maintain the link in engagement with the lug 31.

The entire chain engaging device is arranged in flush relation with the upper face of the floor and does not present any obstruction or projecting portion, and the lower link of the chain may be readily engaged with and disengaged from the lug 31 of the socket piece.

The lower portion of the door 3 is braced by a short stay chain 38, provided at its upper end with a ring 39 through which the main stay chain 21 passes, and the said short stay chain extends downwardly and outwardly from the main stay chain to the lower portion of the door 3. The upper end of the short stay chain 38 is connected with the main or long stay chain at a point intermediate of the ends of the latter, and the door 3 is equipped at its lower portion with an eye 40 into which the lower end of the stay chain 38 is linked. The eye 40 may constitute a part of an eye bolt or pivot, or be mounted on a door in any other preferred manner, and when the chains are fastened by engaging the lower end of the main stay chain with the lug of the chain attaching means, the vertical door 3 is effectually prevented from being forced outwardly by the pressure of the grain.

No claim is made in the present application to the long and short inclined chains, which form a portion of the subject-matter of the said copending application, filed Oct. 19, 1912, Serial No. 726,753.

What is claimed is:—

1. The combination of a stay chain, and a chain attaching device comprising a socket piece receiving a link of the chain and provided with means for engaging the said link, and a closure pivoted to the socket piece and arranged to retain the chain in engagement with the said socket piece.

2. The combination of a stay chain, and a chain attaching device comprising a socket piece receiving a link of the chain and having a projecting lug arranged to extend into the said link of the chain, and means for retaining the chain in engagement with the lug.

3. The combination of a stay chain, and a chain attaching device comprising a socket piece having a projecting lug arranged to engage a link of the chain, and a pivotally mounted locking plate arranged to retain the chain in engagement with the lug.

4. The combination of a stay chain, and a chain attaching device comprising a socket piece having an interior projecting lug arranged to engage a link of the chain, and a locking plate pivoted to the socket piece and arranged to swing to and from the lug and provided at opposite sides thereof with means for engaging the sides of the link to retain the latter on the lug.

5. The combination of a stay chain, and a chain attaching device comprising a socket piece having an interior projecting lug arranged to engage a link of the chain, and a locking plate pivoted to the socket piece and arranged to swing to and from the lug and provided at opposite sides thereof with spaced depending flanges arranged to retain the sides of the link in engagement with the lug.

6. The combination of a stay chain, and a chain attaching device comprising a socket piece provided at opposite sides with recesses and having a lug projecting from the front of the socket piece at an intermediate point between the sides thereof and adapted to receive a link of the chain, and a locking plate pivoted at the back to the socket piece and having projecting portions fitting in the said recesses and adapted to support the locking plate, the latter also having portions arranged to retain the link in engagement with the said lug.

7. The combination of a stay chain provided with an angular link having a vertically disposed lower portion, and a chain attaching device having a socket receiving the vertically disposed portion and provided with an interior lug extending through the said angular link.

8. The combination of a stay chain having a terminal link provided with angularly disposed portions, and an intermediate transverse connecting portion, and a chain attaching device having a projecting lug arranged to engage the angular link, and a pivoted closure for the socket piece arranged to retain the link in engagement with the lug.

In testimony, that I claim the foregoing as my own, I have hereto affixed my signature in the presence of two witnesses.

PHILIP C. MERKER.

Witnesses:
WARREN HARMAN,
R. H. SNYDER.